US012764398B2

(12) United States Patent
Cheng et al.

(10) Patent No.: US 12,764,398 B2
(45) Date of Patent: Oct. 13, 2026

(54) IMAGE PORTION COMBINATION SIGNALS

(71) Applicant: Hewlett-Packard Development Company, L.P., Spring, TX (US)

(72) Inventors: Yow-Wei Cheng, Taipei City (TW); Kuanlin Li, Taipei City (TW); Ling I. Hung, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 13 days.

(21) Appl. No.: 18/873,839

(22) PCT Filed: Jun. 17, 2022

(86) PCT No.: PCT/US2022/034109

§ 371 (c)(1),
(2) Date: Dec. 11, 2024

(87) PCT Pub. No.: WO2023/244247

PCT Pub. Date: Dec. 21, 2023

(65) Prior Publication Data

US 2025/0365485 A1 Nov. 27, 2025

(51) Int. Cl.
*H04N 23/45* (2023.01)

(52) U.S. Cl.
CPC .................................. *H04N 23/45* (2023.01)

(58) Field of Classification Search
CPC ........ H04N 23/45; H04N 23/90; G06V 40/18; G06V 40/19; G06F 3/013; G06F 3/011
See application file for complete search history.

(56) References Cited

U.S. PATENT DOCUMENTS

2014/0368535 A1 12/2014 Salter et al.
2019/0005735 A1* 1/2019 Rönngren ............... G06T 19/20
2019/0179418 A1 6/2019 Marggraff et al.
2021/0165229 A1* 6/2021 Stahl ................... G06F 3/04815
2022/0137703 A1* 5/2022 Miller .................. H04N 9/3185 345/633
2022/0201302 A1* 6/2022 Webb ................... H04N 19/176
2023/0053497 A1* 2/2023 Sarwar .................... G06T 7/246

FOREIGN PATENT DOCUMENTS

EP 3528097 A1 8/2019
EP 3699736 A1 8/2020
WO 2015/192117 A1 12/2015
WO 2021/023819 A1 2/2021

* cited by examiner

*Primary Examiner* — Kelly L Jerabek
(74) *Attorney, Agent, or Firm* — Quarles & Brady LLP

(57) ABSTRACT

In some examples, an electronic device comprises a first camera to capture an image using a lens, a second camera to detect movement of an eye, and a controller coupled to the first and second cameras. The controller is to provide a signal combining a portion of the image captured by the first camera, and eye movement data indicating the movement of the eye detected by the second camera.

20 Claims, 6 Drawing Sheets

IMAGE PORTION COMBINATION SIGNALS

BACKGROUND

Some electronic devices, such as notebooks, laptops, digital cameras, smartphones, and desktop computers, may contain multiple hardware sensors. For instance, an electronic device may include optical sensors (e.g., global shutter cameras, rolling shutter cameras, eye movement tracking cameras), photoplethysmography (PPG) sensors, electromyography (EMG) sensors, inertial sensors (e.g., gyroscopes), etc.

BRIEF DESCRIPTION OF THE DRAWINGS

Various examples will be described below referring to the following figures.

DETAILED DESCRIPTION

Figure 1A:
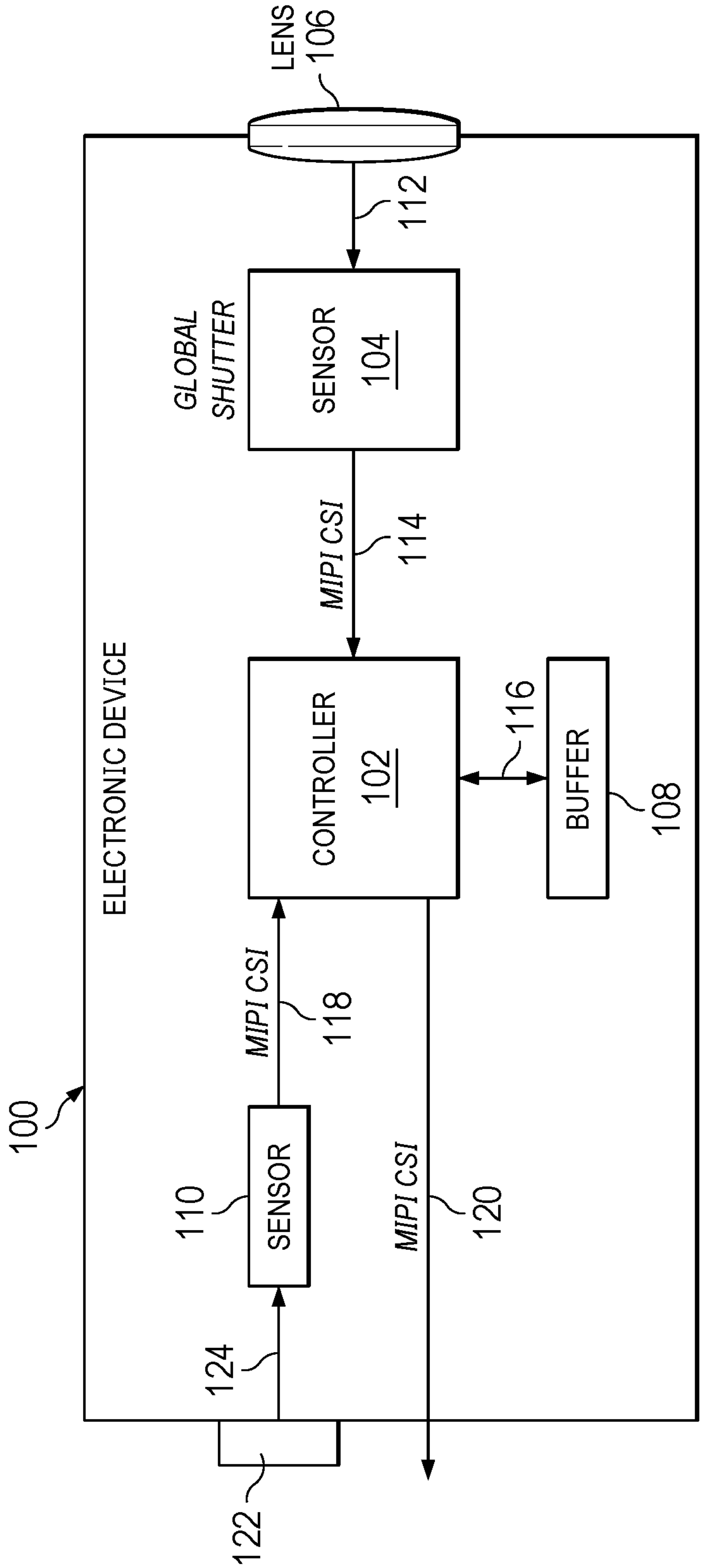
FIG. 1A is a block diagram of an electronic device having multiple sensors, in accordance with various examples.

As described above, an electronic device may include multiple sensors. Although the multiple sensors in an electronic device may capture and provide data at different rates (e.g., a 30 frames-per-second (fps) frame rate for a global shutter camera and a 120 Hz frequency for an eye movement tracking camera), in many cases, these multiple sensors share a common hardware channel. Consequently, any deviation from expected sensor sampling rates (e.g., an eye movement tracking camera's deviation from a 120 Hz frequency) can destabilize data traffic on the hardware channel, thereby destabilizing operations of the electronic device. Further, in a device having a first sensor with a slower sampling rate and a second sensor with a faster sampling rate, the sensor with the slower sampling rate acts as a bottleneck by delaying transmissions that would otherwise occur more quickly (e.g., at the pace of the sensor with the faster sampling rate).

This disclosure describes various examples of an electronic device that mitigates the destabilization and bottlenecking challenges described above by dividing data captured by a first sensor into portions and then producing a series of signals, each signal combining a different one of the portions with data captured by a second sensor. The number (and, thus, the sizes) of the portions is determined based on the rates at which the first and second sensors capture their respective data. For example, the first sensor may be a global shutter camera capturing images at 30 fps, and the second sensor may be an eye movement tracking camera capturing images at 120 Hz, meaning that for every second, the second sensor captures data four times as frequently as the first sensor. To mitigate the risk of the destabilization challenges described above (e.g., due to sporadic deviations in sampling rates), a controller in the electronic device is to divide each image captured by the first sensor into four portions and produces a series of signals, each signal combining a different one of the four portions with the most recently captured data from the second sensor. In this way, should the capture frequency of the second sensor change, the manner in which the first sensor image is divided (e.g., number and/or sizes of portions) is dynamically changed based on the relative sampling rates of the first and second sensors. For instance, if the second sensor drops from 120 Hz to 90 Hz and the first sensor continues capturing images at 30 fps, the second sensor captures data three times as frequently as the first sensor. Thus, the controller is to divide a first sensor image into three portions and to produce a series of signals, each signal combining a different one of the three portions with the most recently captured data from the second sensor. In this way, the electronic device dynamically adapts to variations in sampling rates and avoids the destabilization challenges described above. Further, by dividing data received from a sensor with a slower sampling rate into fractions so that data from that sensor is available for transmission whenever data from a sensor with a faster sampling rate is available for transmission, the bottlenecking challenges described above are mitigated.

FIG. 1A is a block diagram of an electronic device 100 having multiple sensors, in accordance with various examples. The electronic device 100 may be a laptop computer, a notebook computer, a desktop computer, an imaging device such as a camera, a printer, a server, or any other suitable type of electronic device. Other examples include all-in-ones, all-in-one mixed reality headsets, smartphones, drones, and robots. The electronic device 100 may be included as part of a system, such as an appliance, an automobile, an aircraft, a spacecraft, a computer, a printer, or any other suitable type of system. The example electronic device 100 includes a controller 102 (e.g., a microcontroller), a sensor 104 (e.g., a camera having a global shutter; a see-through camera having a complementary metal oxide semiconductor (CMOS)/charge-coupled device (CCD) sensor); and a lens 106. The example electronic device 100 may also include a buffer 108 and a sensor 110 (e.g., an eye-tracking camera(s)). The electronic device 100 may include a lens 122 coupled to the sensor 110 by way of a hardware channel 124. The controller 102 is coupled to the sensor 104 by way of a hardware channel 114, such as a Mobile Industry Processor Interface (MIPI) Camera Serial Interface (CSI), or MIPI CSI. Other examples include Camera Link, Universal Serial Bus (USB), and Institute of Electrical and Electronics Engineers (IEEE) 1394. The sensor 104, in turn, is coupled to the lens 106 by way of a hardware channel 112. The controller 102 may be coupled to the buffer 108 by way of a hardware channel 116. The controller 102 may be coupled to the sensor 110 by way of a hardware channel 118. By way of a hardware channel 120, the controller 102 may couple to a device or system, or to a connection capable of coupling to a device or system, external to the electronic device 100.

In operation, the sensor 104 captures images of an environment of the electronic device 100 using the lens 106. In examples, the controller 102 may trigger the sensor 104 to capture an image through the lens 106. In examples, the sensor 104 may be programmed to repeatedly capture images through the lens 106 at periodic or irregular intervals. In examples, the sensor 110 repeatedly captures images of an environment of the electronic device 100 through the lens 122, for example, of an eye or eyes of a user of the electronic device 100. By repeatedly capturing images of the eye or eyes of a user, the sensor 110 may track the user's eye movements. The sensor 110 may implement any of a variety of other suitable functionalities other than eye-tracking. The scope of this disclosure is not limited to any particular functionalities for the sensors 104, 110.

The sensors 104, 110 may capture and provide images at particular sampling rates. For example, the sensor 104 may capture and provide images at 30 frames per second (fps). In examples, the sensor 110 my capture and provide images at 120 Hz. Other rates are contemplated and included in the scope of this disclosure. Images captured by the sensor 104 are provided to the controller 102 by way of the dedicated hardware channel 114, and, similarly, images captured by the sensor 110 are provided to the controller 102 by way of the dedicated hardware channel 118. Thus, fluctuations in sampling rates (e.g., deviations from the example 120 Hz or 30 fps provided above) are unlikely to negatively affect operations on those hardware channels 114, 118. However, the hardware channel 120 is a shared hardware channel, meaning that the hardware channel 120 carries images captured by both the sensor 104 and the sensor 110. The hardware channel 120, as well as components coupled to the hardware channel 120, may be calibrated to receive images at specific sampling rates, e.g., at the 120 Hz and 30 fps sampling rates described above. Deviations from the expected sampling rates can destabilize operations of the hardware channel 120 and operations of components coupled to the hardware channel 120.

The controller 102 mitigates the risks posed by such deviations by dividing data captured by a first sensor (in this example, the sensor 104) into portions and then producing a series of signals, each signal combining a different one of the portions with data captured by a second sensor (in this example, the sensor 110). The number (and, thus, the sizes) of the portions is determined based on the rates at which the sensors 104, 110 capture their respective data. For example, the sensor 104 may be a global shutter camera capturing images at 30 fps, and the sensor 110 may be an eye movement tracking camera capturing images at 120 Hz, meaning that for every second, the sensor 110 captures data four times as frequently as the sensor 104. To mitigate the risk of the destabilization challenges described above (e.g., due to sporadic deviations in sampling rates), the controller 102 is to divide each image captured by the sensor 104 into four portions and produce a series of signals, each signal combining a different one of the four portions with the most recently captured data from the sensor 110. (Although this disclosure generally describes data received from the sensor 110 as image data, in at least some examples, the image provided by the sensor 110 takes another form besides image data, such as data of any format that indicates user eye movement.) In this way, should the capture frequency of the sensor 110 change, the manner in which the sensor 104 image is divided (e.g., number and/or sizes of portions) is dynamically changed based on the relative sampling rates of sensors 104, 110. For instance, if the sensor 110 sampling rate drops from 120 Hz to 90 Hz and the sensor 104 continues capturing images at 30 fps, the sensor 110 captures data three times as frequently as the sensor 104. Thus, the controller 102 is to divide an image from the sensor 104 into three portions and to produce a series of signals, each signal combining a different one of the three portions with the most recently captured image data from the sensor 110.

Because the sampling rate of the sensor 110 is four times that of the sensor 104, in the time that the sensor 104 captures one full image of an entire scene available to the lens 106, the sensor 110 will have been ready to provide data four times. By providing data from the sensor 104 in fourths, however, sensor 104 data is available for transmission each time sensor 110 data is available for transmission. Thus, sensor 104 does not act as a bottleneck, and further, deviations in sampling rates may be readily adapted without compromising the functional integrity of the electronic device 100. In this way, the controller 102 dynamically adapts to variations in sampling rates and avoids the destabilization challenges described above.

In examples, the controller 102 stores data to and accesses data from the buffer 108. For example, upon receiving an image captured by the sensor 104, the controller 102 may divide the image into portions as described above, and the controller 102 may subsequently store the image portions in the buffer 108. The controller 102 may then access the image portions from the buffer 108 (e.g., according to a first in, first out (FIFO) protocol) when combining each image portion with a respective image from the sensor 110 received by way of the hardware channel 118. The controller 102 may then provide a signal containing the combined image data from the sensors 104, 110 onto the hardware channel 120. In some examples, the controller 102 stores undivided images from the sensor 104 to the buffer 108, and the controller 102 divides images when accessing the images from the buffer 108 for combination with images from the sensor 110.

Figure 1B:
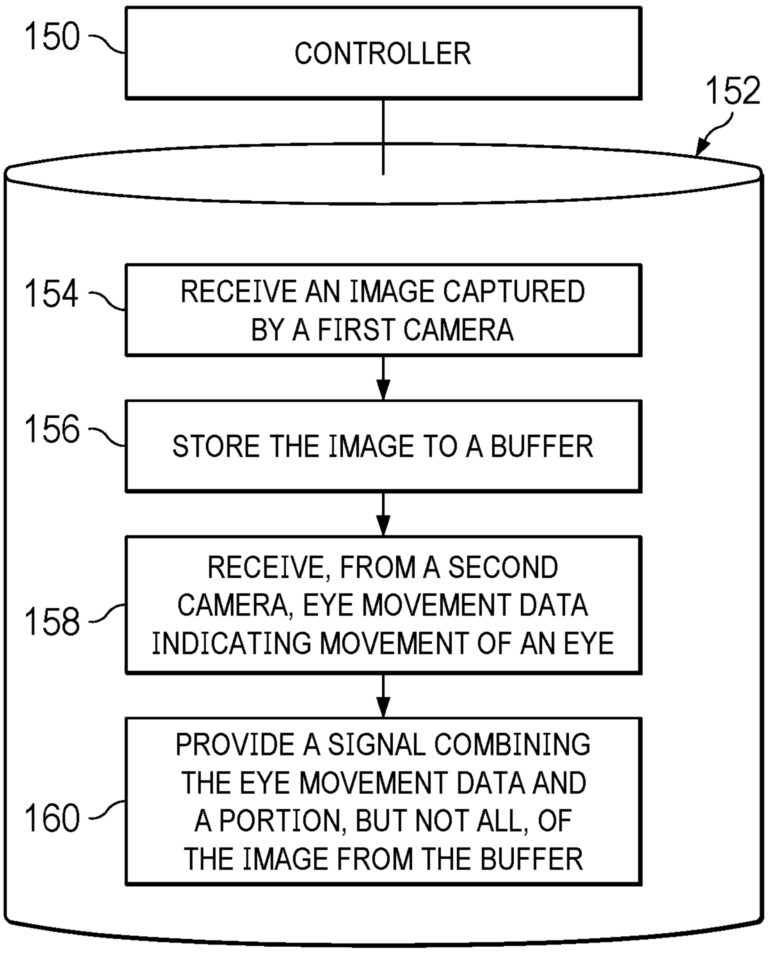
FIG. 1B is a block diagram of a computer-readable medium coupled to a controller, in accordance with various examples.

FIG. 1B is a block diagram of a computer-readable medium coupled to a controller, in accordance with various examples. Specifically, a controller 150 (e.g., the controller 102 of FIG. 1A) is coupled to storage 152 (e.g., random access memory (RAM) or read-only memory (ROM) that may form part of the controller 102 of FIG. 1A or may be coupled to the controller 102 of FIG. 1A). The storage stores executable code (e.g., instructions), which, when executed by the controller 102, causes the controller 102 to perform specific tasks. Specifically, the controller 102 may be caused to receive an image captured by a first camera, such as sensor 104 (FIG. 1A) (154). The controller 102 may be caused to store the image (or portions of the image) to a buffer, such as buffer 108 (FIG. 1A) (156). The controller 102 may be caused to receive, from a second camera (e.g., sensor 110), eye movement data indicating movement of an eye (158). The controller 102 may be caused to provide a signal combining the eye movement data and a portion, but not all, of the image from the buffer 108 (160). The specific manner in which the controller 102 combines the eye movement data with the portion of the image from the buffer 108 is determined based on the rates at which the sensors 104, 110 capture their respective data, as described in detail above.

Figure 2:
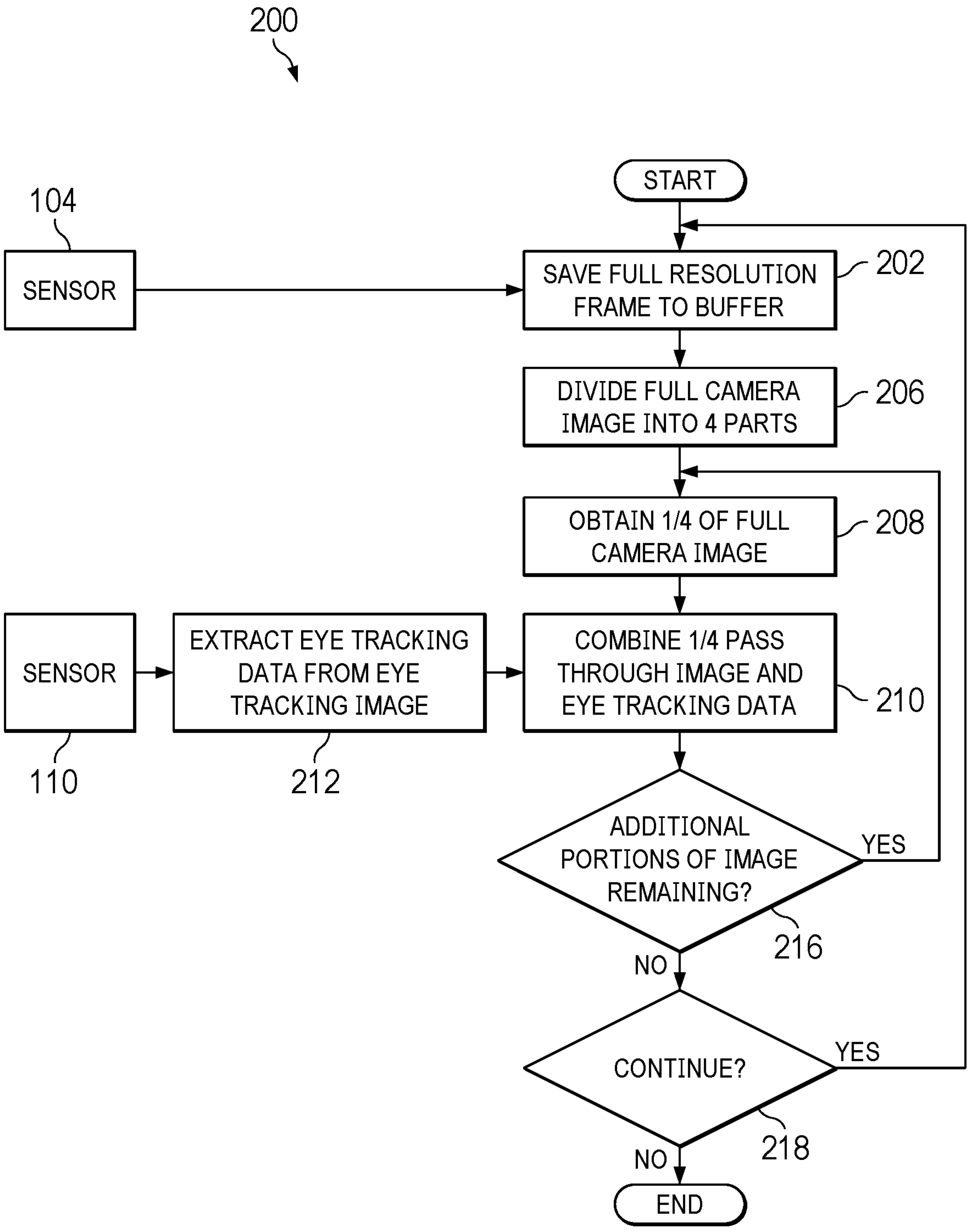
FIG. 2 is a flow diagram of a method for combining signals from different sensors in an electronic device, in accordance with various examples.

FIG. 2 is a flow diagram of a method 200 for combining signals from different sensors in an electronic device, in accordance with various examples. The method 200 is described in the illustrative context of the electronic device 100 of FIG. 1A. The method 200 may be performed by a controller of the electronic device, such as the controller 102, for example. The method 200 begins with the controller 102 saving a full resolution frame (e.g., a complete, undivided image) to a buffer, such as buffer 108 (202). As numeral 204 indicates, such an image may be received from a camera, such as sensor 104. The method 200 includes the controller 102 dividing the full image into multiple (e.g., four) portions (206). The method 200 includes the controller 102 combining a portion (e.g., one-fourth of the full image) (208) with eye tracking data (210). As numerals 212 and 214 indicate, eye tracking data may be obtained from image(s) provided by an eye-tracking camera, such as sensor 110. The controller 102 may provide the combined signal on shared hardware channel 120 (not expressly shown in the method 200). The method 200 includes the controller 102 determining whether additional portions of the full image remain (216), and, if so, control of the method 200 is provided to 208. Otherwise, if all portions of the full image have been provided on the shared hardware channel 120, the method 200 includes the controller 102 determining whether additional images from the sensors 104, 110 are to be processed and transmitted, and, if so, control of the method 200 is provided to 202. Otherwise, the method 200 is complete.

Figure 3A:
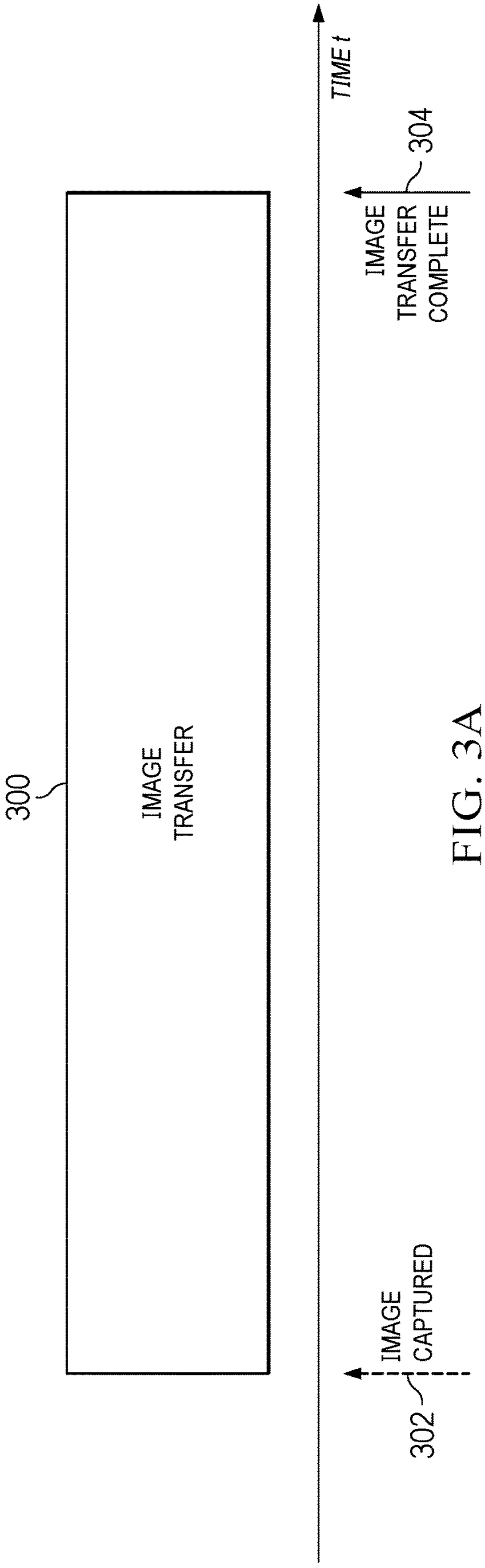
FIGS. 3A and 3B are graphs depicting differences in sensor data transmission between prior art electronic devices and various examples of electronic devices described herein.
Figure 3B:
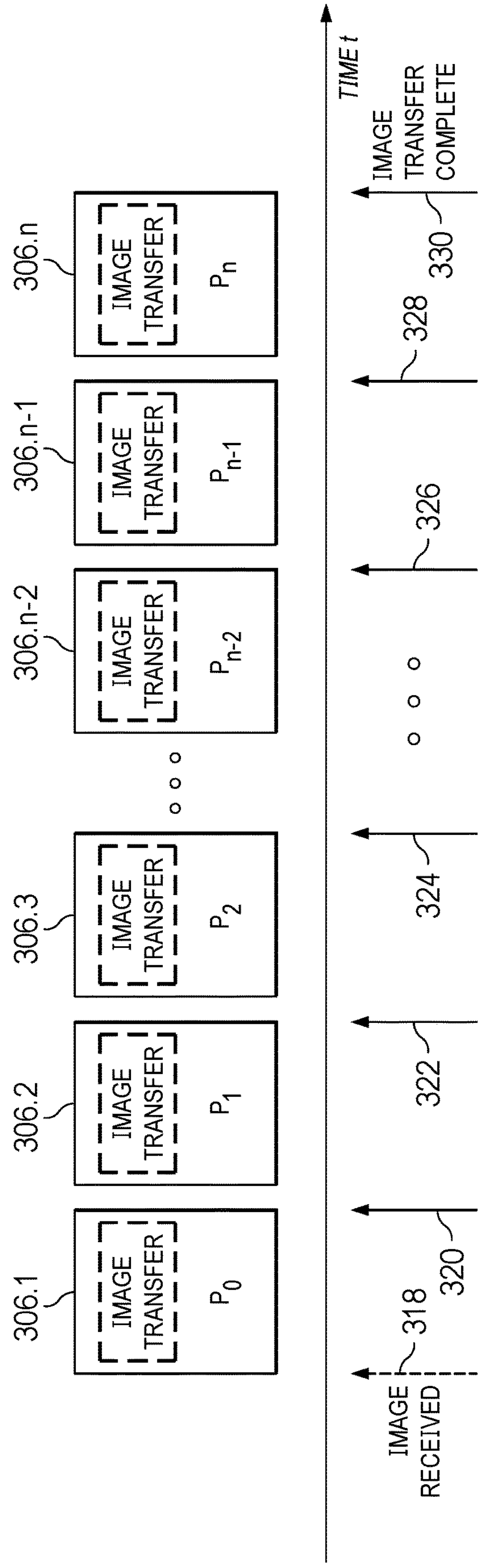

FIGS. 3A and 3B are graphs depicting differences in sensor data transmission between prior art electronic devices and various examples of electronic devices described herein. In both graphs, time is depicted on the x-axis. In existing electronic devices, an image may be provided on a shared hardware channel in its entirety, as numeral 300 depicts. More particularly, a controller begins providing the image at time 302, and the controller continuously provides the image until it is fully provided at time 304. In contrast, and consistent with the examples described herein, FIG. 3B demonstrates the partition of a single image into n portions 306.1, 306.2, . . . , 306.*n*. The controller 102 (FIG. 1A) begins combining each portion of the single, full image with data from sensor 110 (e.g., eye tracking data) at time 318. At time 320, the portion 306.1 has been combined with data from sensor 110 and provided on the shared hardware channel 120. At time 322, the portion 306.2 has been combined with data from sensor 110 and provided on the shared hardware channel 120. At time 324, the portion 306.3 has been combined with data from sensor 110 and provided on the shared hardware channel 120. At time 326, the portion 306.*n*−2 has been combined with data from sensor 110 and provided on the shared hardware channel 120. At time 328, portion 306.*n*−1 has been combined with data from sensor 110 and provided on the shared hardware channel 120. At time 330, portion 306.*n* has been combined with data from sensor 110 and provided on the shared hardware channel 120.

Figure 4:
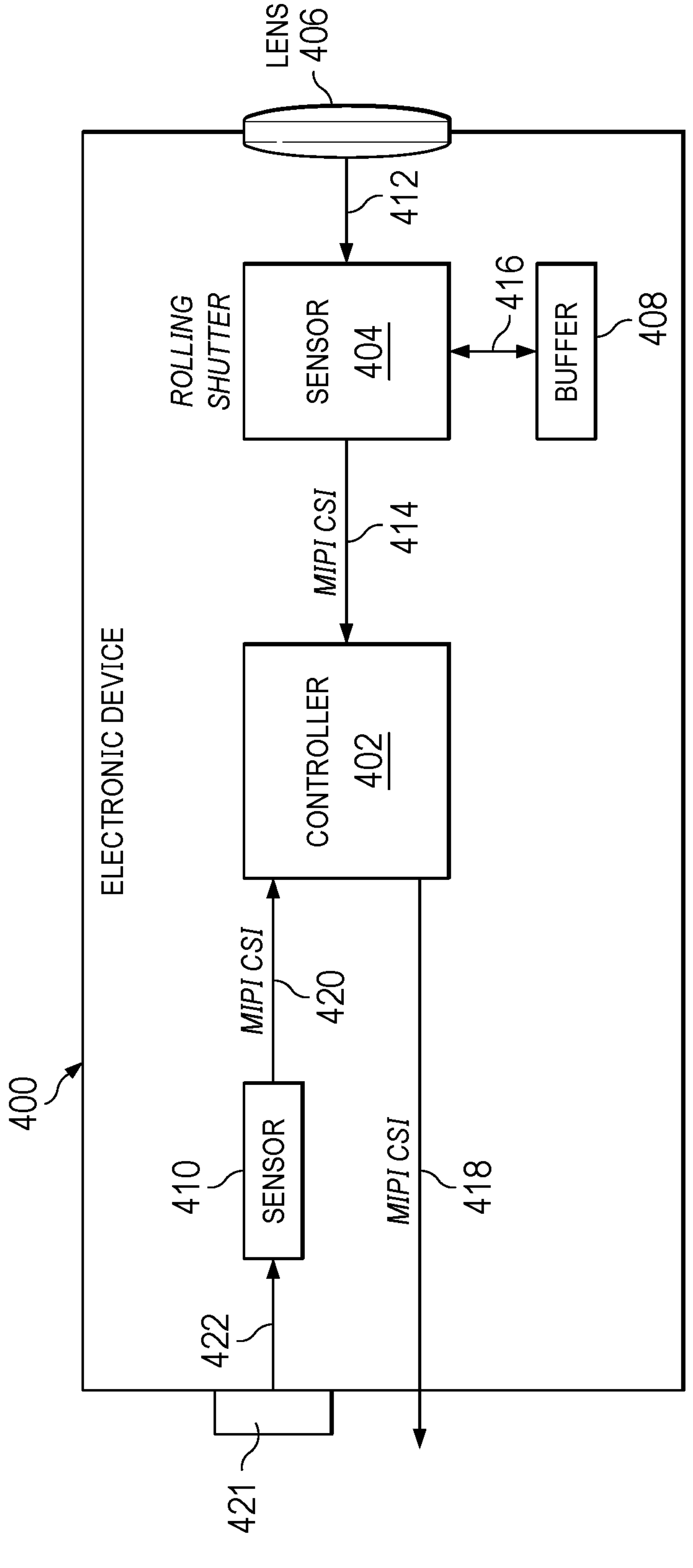
FIG. 4 is a block diagram of an electronic device having multiple sensors, in accordance with various examples.

FIG. 4 is a block diagram of an electronic device 400 having multiple sensors, in accordance with various examples. The example electronic device 400 includes a controller 402, a sensor 404 (e.g., a rolling shutter CMOS/CCD camera), a lens 406, a buffer 408, and a sensor 410 (e.g., a biometric sensor such as a photoplethysmography (PPG) sensor). The controller 402 may be coupled to the sensor 404 and sensor 410 by way of hardware channels 414 (e.g., MIPI CSI) and 420 (e.g., MIPI CSI), respectively. Other examples include Camera Link, Universal Serial Bus (USB), and Institute of Electrical and Electronics Engineers (IEEE) 1394. The sensor 404 may be coupled to the lens 406 by way of hardware channel 412, and the sensor 404 may be coupled to the buffer 408 by way of hardware channel 416. A lens 421 may be coupled to the sensor 410 by way of hardware channel 422. A shared hardware channel 418 (e.g., MIPI CSI, Camera Link, Universal Serial Bus (USB), and Institute of Electrical and Electronics Engineers (IEEE) 1394) may be coupled to the controller 402 and the controller 402 may provide signals combining data from sensors 404, 410 on the shared hardware channel 418.

The rolling shutter of the sensor 404 operates differently than the global shutter of the sensor 104. A global shutter of the sensor 104 captures an entire scene through the lens 106, thereby forming a complete image. The controller 102 subsequently divides the complete, single image into multiple portions, as described above. In contrast, the rolling shutter of the sensor 404 captures and provides (via the lens 406) a portion of a scene at a time (e.g., on a "line-by-line" basis). For example, a rolling shutter sensor 404 may capture one-tenth of a scene (e.g., one-tenth of a complete image) at a time. Thus, in examples, the rolling shutter sensor 404 may continuously and repeatedly provide one-tenth image portions of a scene. The sensor 404 may store each portion (e.g., one-tenth image portion) in the buffer 408. The sensor 404 may access the stored image portion from the buffer 408 and provide the image portion to the controller 402. In turn, the controller 402 may combine that image portion with data from the sensor 410 (e.g., PPG data) to form a combined signal. The controller 402 may provide the combined signal on the shared hardware channel 418. In an example, the sensor 410 operates at 300 Hz, and the sensor 404 operates at 30 fps. Because the sampling rate of the sensor 410 is ten times faster than the sensor 404, the sensor 404 is to provide one-tenth of the scene (e.g., of a complete image) at a time. Thus, each time one-tenth of an image is captured and provided to the controller 402, that one-tenth image portion is combined with available data from the sensor 410 to form a combined signal, and the controller 402 may subsequently provide the combined signal on the shared hardware channel 418. Because the sampling rate of the sensor 410 is ten times that of the sensor 404, in the time that the sensor 404 captures one full image of an entire scene available to the lens 406, the sensor 410 will have been ready to provide data ten times. By providing data from the sensor 404 in tenths, however, sensor 404 data is available for transmission each time sensor 410 data is available for transmission. Thus, sensor 404 does not act as a bottleneck, and further, deviations in sampling rates may be readily adapted without compromising the functional integrity of the electronic device 400. Further still, in the example of FIG. 4, the buffer 408 need not store as much image data as buffer 108 and thus may be smaller than buffer 108.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An electronic device, comprising:

a first camera to capture an image using a lens;

a second camera to detect movement of an eye; and a controller coupled to the first and second cameras, wherein the controller is to divide the image into a plurality of portions, wherein a quantity of the plurality of portions corresponds to a ratio of a capture frequency of the second camera to a frame rate of the first camera, and wherein the controller is to provide a signal combining:

a portion of the image captured by the first camera from the plurality of portions; and eye movement data indicating the movement of the eye detected by the second camera.

2. The electronic device of claim 1, wherein the signal does not contain all of the image.

3. The electronic device of claim 1, wherein the electronic device includes a buffer to store the captured image.

4. The electronic device of claim 1, wherein a size of the portion of the image is based on the frame rate of the first camera and the capture frequency of the second camera.

5. The electronic device of claim 1, wherein the controller is to produce the signal consistent with any one of a Mobile Industry Processor Interface (MIPI) Camera Serial Interface (CSI), Camera Link, Universal Serial Bus (USB), and Institute of Electrical and Electronics Engineers (IEEE) 1394 specifications.

6. The electronic device of claim 1, wherein the first camera includes one of a complementary metal oxide semiconductor (CMOS) sensor or a charge-coupled device (CCD) sensor.

7. The electronic device of claim 1, wherein the first camera has a global shutter.

8. The electronic device of claim 1, wherein the controller is to, based on a change of the capture frequency of the second camera, adjust a quantity of a plurality of portions into which a second image captured by the first camera is divided.

9. The electronic device of claim 1, wherein each portion of the plurality of portions corresponds to an instance of a plurality of instances of capturing eye movement data by the second camera.

10. The electronic device of claim 9, wherein the controller is to:

for each particular portion of the plurality of portions:

combine the particular portion with the eye movement data captured in the instance corresponding to the particular portion to generate combined data; and provide the combined data on a hardware channel.

11. A non-transitory, computer-readable medium storing executable code which, when executed by a controller, causes the controller to:

receive an image captured by a first camera;

store the image to a buffer;

receive, from a second camera, eye movement data indicating movement of an eye;

divide the image into a plurality of portions, wherein a quantity of the plurality of portions corresponds to a ratio of a capture frequency of the second camera to a frame rate of the first camera; and provide a signal combining the eye movement data and a portion, but not all, of the image from the plurality of portions.

12. The computer-readable medium of claim 11, wherein the first camera has a global shutter.

13. The computer-readable medium of claim 11, wherein a size of the portion of the image is based on the frame rate of the first camera and the capture frequency of the second camera.

14. The computer-readable medium of claim 11, wherein the first camera includes one of a complementary metal oxide semiconductor (CMOS) sensor or a charge-coupled device (CCD) sensor.

15. The computer-readable medium of claim 11, wherein the executable code, when executed by the controller, causes the controller to, based on a change of the capture frequency of the second camera, adjust a quantity of a plurality of portions into which a second image captured by the first camera is divided.

16. The computer-readable medium of claim 11, wherein each portion of the plurality of portions corresponds to an instance of a plurality of instances of capturing eye movement data by the second camera.

17. An electronic device, comprising:

a camera with a rolling shutter to capture a plurality of portions collectively representing an image;

a biometric sensor to capture biometric data, wherein a quantity of the plurality of portions corresponds to a ratio of a capture frequency of the biometric sensor to a frame rate of the camera; and a controller coupled to the camera and the biometric sensor, the controller to:

receive a portion of the image from the plurality of portions, and the biometric data; and provide a signal combining the portion of the image and the biometric data.

18. The electronic device of claim 17, comprising a buffer to store the portion of the image for subsequent access.

19. The electronic device of claim 17, wherein the controller is to produce the signal consistent with any one of a Mobile Industry Processor Interface (MIPI) Camera Serial Interface (CSI), Camera Link, Universal Serial Bus (USB), and Institute of Electrical and Electronics Engineers (IEEE) 1394 specifications.

20. The electronic device of claim 17, wherein each portion of the plurality of portions corresponds to an instance of a plurality of instances of capturing biometric data by the biometric sensor.

* * * * *